United States Patent [19]

Coplan et al.

[11] 4,017,030
[45] Apr. 12, 1977

[54] DEVICES FOR CONTROLLED RELEASE OF VAPORS

[75] Inventors: Myron J. Coplan, Natick; Thomas W. Brooks, Medway, both of Mass.

[73] Assignee: Albany International Corporation, Dedham, Mass.

[22] Filed: Sept. 26, 1975

[21] Appl. No.: 617,261

Related U.S. Application Data

[63] Continuation-in-part of Ser. No. 519,603, Oct. 31, 1974, abandoned.

[52] U.S. Cl. .................................. 239/44; 239/53; 43/129; 261/99; 206/.5; 312/31.04; 222/3; 222/187

[51] Int. Cl.² ................. A61L 9/04; A24F 25/00

[58] Field of Search ............... 239/145, 51, 34, 43, 239/44–46, 49, 53–57; 128/172, 185, 186, 192, 193, 212; 43/129, 131, 132 R; 346/140 R, 140 A; 424/14, 15, 16, 19, 21; 261/95, 99; 206/.5, 498; 312/31.04; 222/3, 187

[56] References Cited

UNITED STATES PATENTS

| | | | |
|---|---|---|---|
| 1,259,911 | 3/1918 | Seibert | 43/131 |
| 1,472,063 | 10/1923 | Goldsmith | 206/.5 |
| 2,103,609 | 12/1937 | Bradburn | 239/54 |
| 2,239,628 | 4/1941 | Seki | 239/44 X |
| 2,698,767 | 1/1955 | Hartmann | 239/44 |
| 2,733,098 | 1/1956 | Holt | 239/55 X |
| 2,807,901 | 10/1957 | Gilowitz | 239/49 |
| 2,895,606 | 7/1959 | Hoag | 206/498 X |
| 2,975,853 | 3/1961 | Friend | 181/33 R |
| 2,979,268 | 4/1961 | Brun | 239/57 X |
| 3,015,340 | 1/1962 | Montz et al. | 261/99 X |
| 3,211,345 | 10/1965 | Geiger | 239/44 X |
| 3,379,855 | 4/1968 | Forrester et al. | 222/187 X |
| 3,596,833 | 8/1971 | Gould | 239/54 |

FOREIGN PATENTS OR APPLICATIONS

| | | | |
|---|---|---|---|
| 203,145 | 9/1956 | Australia | 43/131 |
| 628,483 | 6/1927 | France | 239/44 |
| 909,157 | 11/1945 | France | 239/34 |
| 274,140 | 7/1927 | United Kingdom | 239/44 |

*Primary Examiner*—Robert S. Ward, Jr.
*Attorney, Agent, or Firm*—Kenway & Jenney

[57] ABSTRACT

A device for controlling the release of vapors such as insect attractants, insecticides, and other vapors such as flower fragrances (the release being a timed matter in accordance with a predetermined configuration of the device), consisting of a microdispenser for accurately controlled dissemination of vaporizable materials comprising an elongated conduit of regulated cross-sectional area and length, and a vaporizable substance enclosed in said conduit. The filamentary conduit has one open and one closed end. In another variant, a filamentary conduit can be sealed between two open ends to provide a pair of end-to-end closed end conduits. The vapor producing substance is placed in the capillary conduit by suitable means. A single filamentary tube may be used, or a plurality of such tubes together. Liquid is contained within the conduit against the action of gravity and vibrations.

40 Claims, 18 Drawing Figures

FIG. 1
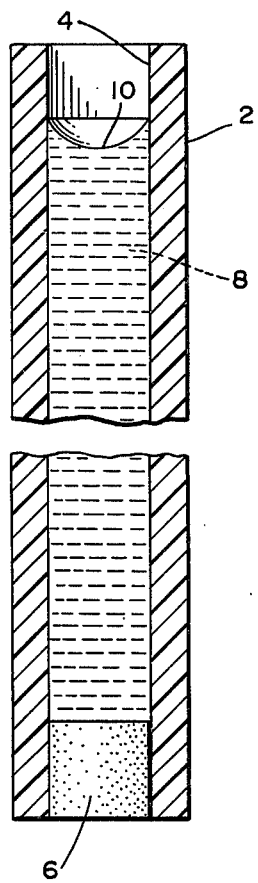
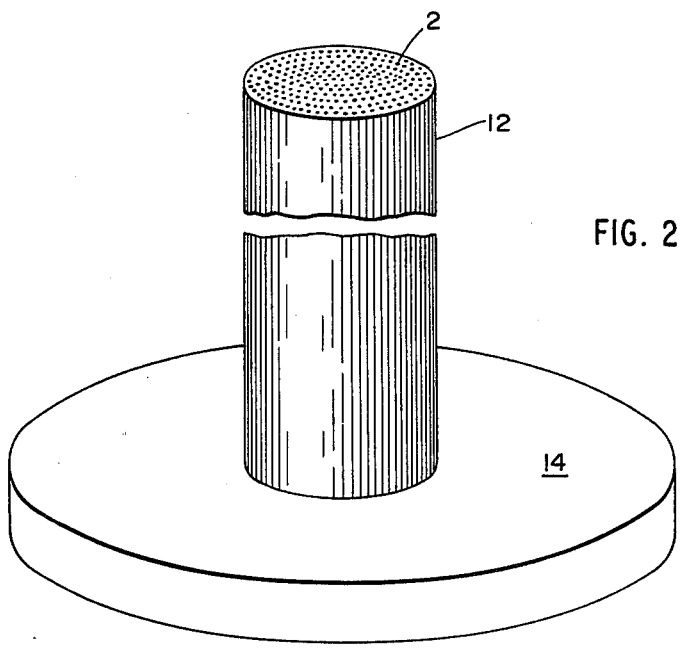
FIG. 2
CONTINUOUS TAPE
FROM WHICH SINGLE
DISPENSERS ARE CUT
CUT
LINE
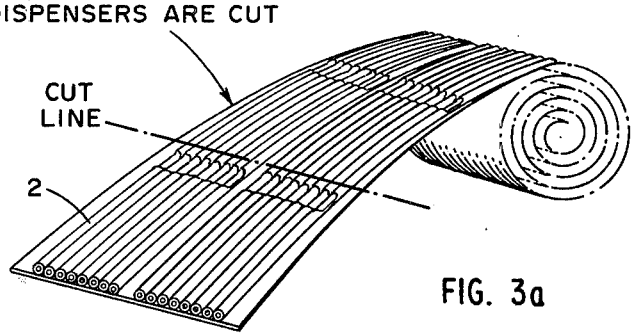
FIG. 3a
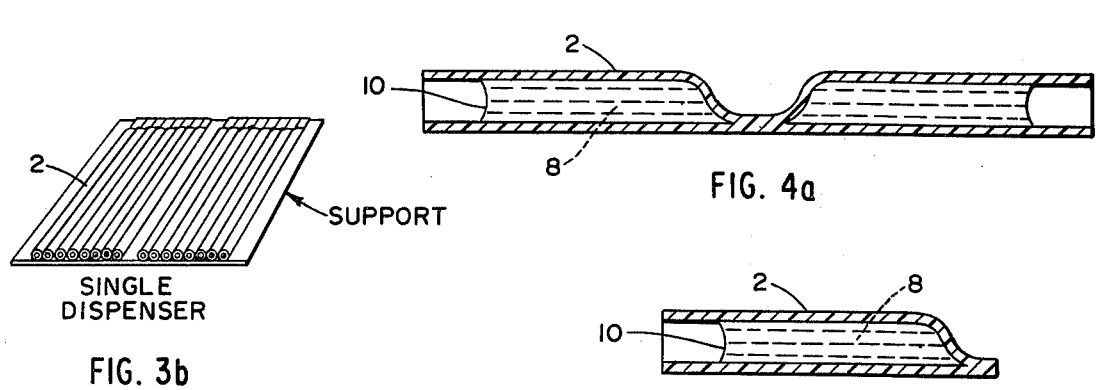
SUPPORT
SINGLE
DISPENSER
FIG. 3b
FIG. 4a
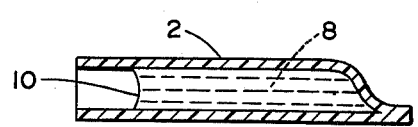
FIG. 4b

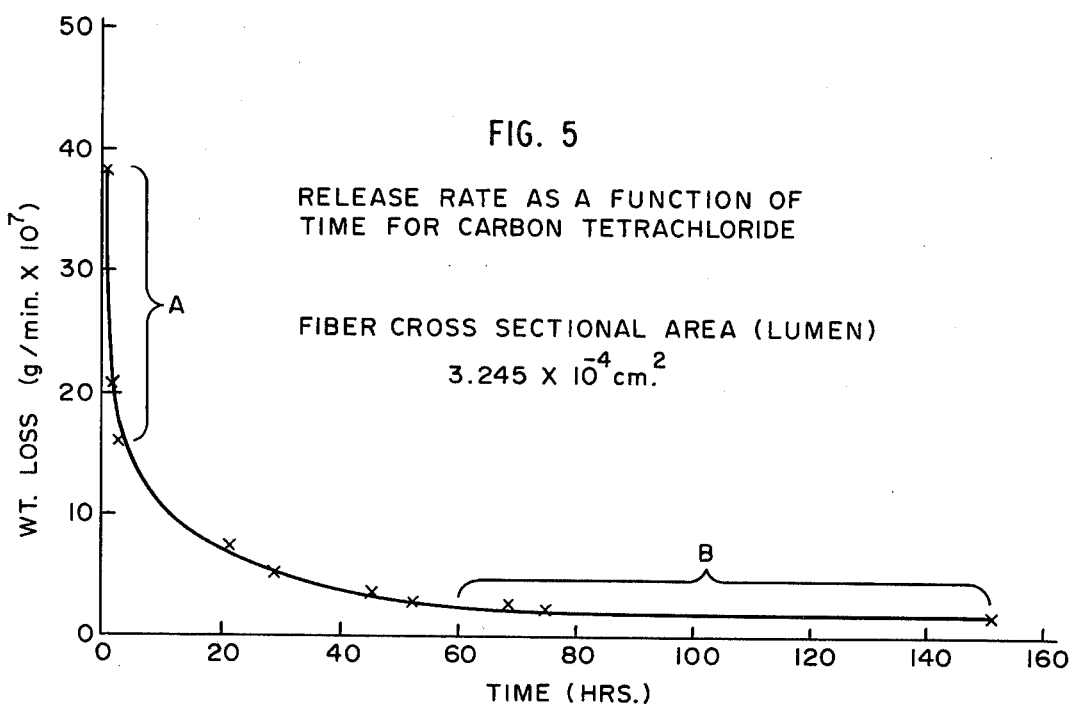
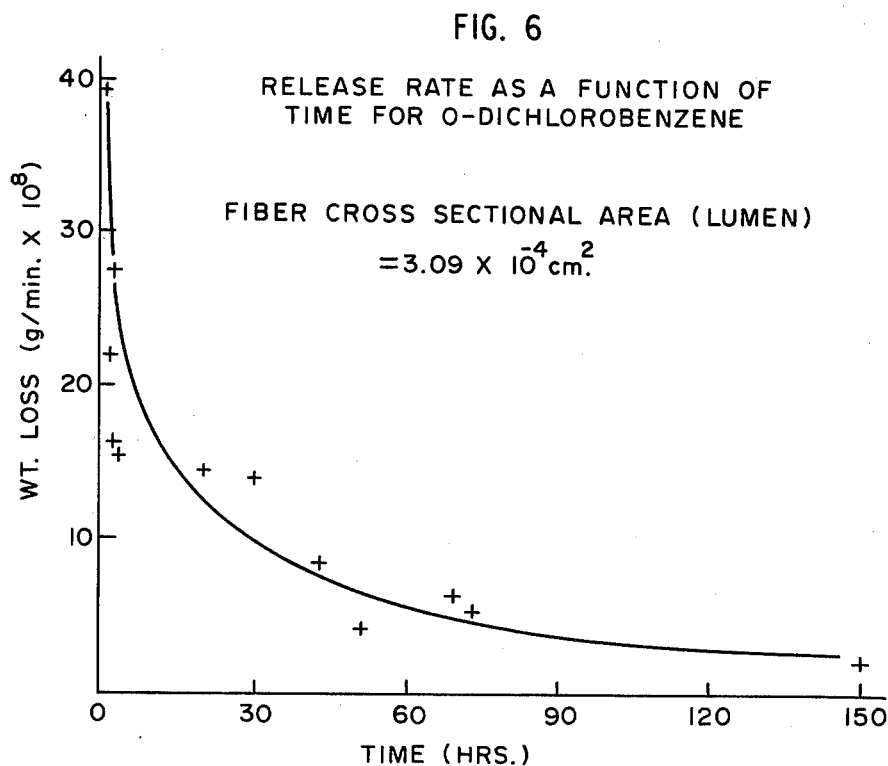

RELEASE RATE AS A FUNCTION OF TIME FOR LINALOOL

FIBER CROSS SECTIONAL AREA (LUMEN) = $3.14 \times 10^{-4}$ cm.$^2$

RELEASE RATE AS A FUNCTION OF TIME FOR GRANDLURE

LUMEN CROSS SECTIONAL AREA = $3.14 \times 10^{-4}$ cm.$^2$

RELEASE RATE OF DISPARLURE AT 70°F 65 RH

FIBER AREA = $3.14 \times 10^{-4}$ cm.$^2$ (LUMEN)

RELEASE RATE OF FRONTALIN

DOUBLE OPEN END
VERTICAL
0.4 mm. I.D.

RELEASE RATE OF FRONTALIN

SINGLE OPEN END
0.4 mm. I.D.

DEVICES FOR CONTROLLED RELEASE OF VAPORS

This application is a continuation in part of U.S. patent application Ser. No. 519,603, filed Oct. 31, 1974, Thomas W. Brooks, and Myron J. Coplan, inventors, now abandoned.

BACKGROUND OF THE INVENTION

While the invention is primarily concerned with the practical methods of insect control, nevertheless the concepts here involved are applicable to all uses of controlled vapor dispersion. However, since insect attractants are of major importance, the description of the invention will be directed to such a usage.

That insects can be attracted or repelled by certain substances has been known for a great many years. In recent years, efforts have been made to utilize and extend this primitive knowledge for the purpose of controlling insect pests and mitigating the harmful effects they can inflict on man, animals, agricultural crops, clothing, etc. This has led to the recognition that olfaction plays a key role in communication among insects and that the media of communication are chemical substances produced and emitted by insects for communicative purposes. These chemical messengers have come to be called pheromones and are known to be highly specific as to insect species and elicited response. Pheromones may serve as alarm signals, food finding aids, mating signals, trail markers, or defensive agents for warding off predators.

A great many insect sex attractant pheromones have been isolated and identified as to chemical composition and structure. They typically are straight chain or cyclic organic compounds of carbon, hydrogen, and oxygen, falling in the molecular weight range of 150 to 300. The structure and biological activity of most of the known insect sex pheromones are extensively reviewed in the book, *INSECT SEX PHEROMONES*, by Martin Jacobson, Academic Press, New York, 1972. Of the identified insect sex pheromones, many have been synthesized and the synthetic materials used in a variety of ways to facilitate insect pest control.

Two general methods of employing insect sex pheromones have beemn applied. One method involves using the pheromone to attract a target insect to a trap or to a point where it can be destroyed by an insecticide. Trapping also serves as a survey means of timing the application of chemical insecticides. A second method involves broadcasting small point sources of pheromone over an infested area to disorient the insects and make it difficult or impossible for the opposite sexes to find one another for mating. This latter method is referred to as the discruption technique, and is intended to suppress the pest insect population by subverting or interrupting the natural mating and reproduction process.

Effective and economical use of insect sex pheromones for accomplishing insect pest control, by whatever strategy, requires a suitable means of dissemination. A dissemination method or device must accomplish discharge of the pheromone to the atmosphere at a specific rate peculiar to the target insect, and for whatever period of time the particular adult insects are active in mating. Since synthetic insect sex pheromones are frequently rather expensive materials, the dissemination means or devices must be as efficient as possible in utilization of pheromone. Thus, a practical and economical sustained release system must be employed for disseminating pheromone which provides for a controlled discharge of the attractant at a specified rate and for a specified period of time.

Numerous examples of sustained or controlled release systems exist in the prior art of insect pest control. U.S. Pat. Nos. 2,956,073, 3,116,201, and 3,318,769 teach the manufacture and use of insecticides formulated into shaped plastic articles which serve to release the insecticide at a prescribed rate over an extended period of time. U.S. Pat. No. 3,539,465 teaches the microencapsulation of hydrophilic liquid-in-oil emulsions in which polymeric capsular walls serve to mediate the controlled release of encapsulants such as insecticides and other biocidal agents. U.S. Pat. No. 3,740,419 teaches the use of insecticide impregnated wood chips as a slow release pest control device. U.S. Pat. No. 3,577,515 teaches the manufacture of microencapsulated insecticidal compositions by using interfacial polymerization to form a porous capsule wall which serves to regulate the rate of delivery of insecticide. U.S. Pat. No. 3,590,118 describes a slow release insect repellant system in the form of a breathable acrylic film. U.S. Pat. No. 3,592,910 discloses use of terpenoid resin-insecticide formulations which are designed to extend the period of effectiveness for nonpersistent or moderately persistent insecticides.

Each of these methods has its own particular cluster of advantages and drawbcks, which need not be elaborated here. Rather, it would be more in order to point out that researchers and economic entamologists continue to seek a more satisfactory scheme for the uniform, quantitatively predictable, prolonged automatic dissemination of miniscule amounts of active volatiles at an extremely low controlled rate. Sometimes the dissemination is desired on a tree-by-tree basis as, for example, in the control of certan orchards pests. Sometimes the dissemination is to be uniform and cover large areas, as in the use of pheromones to disrupt mating signals of insect pests attacking field crops. One possible superior means of achieving these ends entails the use of fine capillary tubes, both as containers and discharge devices.

Several researchers have had more or less limited success in the use of micro-tubes or micro-capillaries in laboratory tests and under limited experimental field conditions. We have encountered, and indeed have other workers in this area, several significant obstacles to the widespread practical applicability of the conventional forms of these devices. We have also discovered, however, a novel and superior variation of the micro-tube dissemination method and device which overcomes these obstacles and provides an extremely useful manner of using fiber tubes for the intended purpose in practical applications.

Previous users of micro-tubes for pheromone delivery have regularly employed them as containers and dispensers with both ends of the tube open to the atmosphere. The rate of pheromone discharged from the ends of the micro-tubes or micro-capillaries when used this way has generally been excessively high for many practical field applications. Moreover, when open at both ends such devices are subject to high material losses due to mechanical shock, vibration, wind, and the like.

Our invention, which comprises the use of micro-tubes or capillary channels of microconduits sealed at one end, while exceedingly simple, eliminates several significant obstacles to the use of such devices and confers on them practicability to an extent not heretofore contemplated by those familiar with the art.

As an example of the prior art, reference may be drawn to the article, "NOVEL TRAPPING AND DELIVERY SYSTEMS FOR AIRBORNE INSECT PHEROMONES," by Lloyd E. Browne, et al, *J. Insect Physiol.*, 1974, Vol. 20, pp. 183 to 193. On Pages 187–188, a laboratory testing scheme for assaying pheromone efficiency is described where the active liquid is filled into a 5μl glass capillary mounted vertically and open at both ends. The contained liquid is continuously evaporated from the liquid-air interface exposed at the bottom of the capillary to which it continuously feeds by the action of gravity. While the delivery rate may be kept quite constant, it is also quite high, being of the order of 1 μl/minute. The dimension of the capillary tube is about 5 cm long by 0.4 mm diameter. A full charge of hexane will be discharged in about 5 minutes in the test described.

Another example of the prior art using microtubes is described by Shorey et al, in "SEX PHEROMONES OF LEPIDOPTERA. XXX. DISRUPTION OF SEX PHEROMONE COMMUNCIATIONS IN 'TRICHOPLASIA NI' AS A POSSIBLE MEANS OF MATING CONTROL," *Environmental Entomology*, Vol. 1, No. 5, October 1972, pp. 641–645. Schemes for evaporation of pheromones at lower, intermediate, and higher rates are discussed. It should be noted that in this work the authors view the use of micro-tubes as part of the higher rate technique.

"The substrates for higher evaporation rates were based on the principles of a liquid film of the pure chemical being exposed to the air. The rate was varied by varying the area of exposed flm. These evaporators could be left in the field for several days without a decrease in their release rate. In practice, however, they were serviced and recharged daily. The 10 ng/min evaporator consisted of an 0.38 mm ID Teflon tube, 20 mm long, held vertically in a clip attached to the wooden stake. Looplure was held in the lower end of the tube by capillarity. An inverted aluminum weighing cup attached to the top of the stake was used to shield the tube from excessive wind, which at times forced the looplure out of unshielded tubes. The 30 ng/min evaporator consisted of three similar Teflon tubes held in a single clip. "

The dissemination principle of this scheme is the same as that from the previous citation: liquid continously evaporates at a liquid-air interface maintained by gravity at the bottom of a double open-end vertical capillary tube. The particular dissemination rates for those materials are at least an order of magnitude higher and up to three orders of magnitude higher than can be achieved by the use of our invention. It will also be noted that because of the double open-end configuration, the tube contents are unstably retained and subject to being blown out by wind. Note, also, the requirement for daily attention. Both of these objectionable situations are obviated by our device.

As a further example of the prior art, we may cite Pitman and Vite, "FIELD RESPONSE OF DENDROCTONUS PSEUDOSUGAE (COLEOPTERA: SCOLYTIDAE) TO SYNTHETIC FRONTALIN," *Annals of The Entomogical Society of America*, Vol. 63, No. 3, pp. 661–664, May 1970, who used 0.4 mm ID glass capillary tubes for the dissemination of synthetic frontalin. The release rate that they experienced was 5 mg/hr. By the use of our invention, with the same pheromone and approximately equivalent size tubing, the rate was reduced by two to three orders of magnitude (i.e., 100 to 1,000 times). As a result, the practical feasibility of our scheme to long-term controlled dissemination of minute amounts of this and other pheromone materials is superior; so much so as to render our method a practical scheme for commercial pest management, in contrast to the limited experimental activities of the prior workers.

SUMMARY OF THE INVENTION

Accordingly, the basic purpose of this invention is to provide an improved means of dissemination of vapors for several purposes, such as, for example, pheromones and fragrant vapors, in which the timing of the dissemination of the vapor can be controlled and its duration extended by evaporation from an occluded liquid-gas interface within the microconduit through a stagnant boundary layer of evaporant at an interface with the external atmosphere.

Another object of the invention is the provision of such device, in which the device can be easily loaded with a proper amount of material to be vaporized.

A further object of the invention is the provision of a device of the above kinds, which accomplishes discharge of the vapor, particularly a pheromone, to the atmosphere at a specific rate peculiar to the target insect, and for whatever period of time the particular adult insects are active in mating.

Another object of the invention is a provision of devices of the above kinds, in which the means of dissemination of the substance to be vaporized is efficient in its utilization thereof.

A further object of the invention is the provision of means to add to an enviroment, at a controlled rate, a vapor such as fragrances of flowers, fruits, woods, and the like, for esthetic effects.

A further object of the invention is to provide an improved means for disseminating vapors having therapeutic uses, such as anti-histamine inhalants, biocides, and the like. Insect repellancy and the like is also contemplated hereby.

Other objects, features, and advantages of the invention will be in part apparent and in part pointed out hereinafter.

As evidence of the significantly improved controlled release capabilities of our invention, some data have been collected from the prior art and are present in Table I(A), below. Similar experiments performed by the present inventors involving the use of micro-tubes of polyethylene terephthalate open at both ends disseminating one of the pheromones identified in Part (A) is presented in Table I(B). By way of comparison, illustrations of the present invention are shown in Table I(C).

TABLE I
COMPARATIVE DISSEMINATION RATES

| | | Tube | | Rate Per Tube | Rate Normalized |
|---|---|---|---|---|---|
| Source | Evaporant | Dia(mm) | A(mm²) | mg/hr | mg/mm²/hr |
| (A) PRIOR ART - OPEN BOTH END TUBES | | | | | |
| 1. Browne,J.Ins.Phys. | hexane | .4 | .125 | 60 | 480 |
| 2. Shorey,Env. Ent. | looplure | .38 | .125 | .0006 | .0048 |
| 3. Pitman/Vite,Boyce Thompson | frontalin | .4 | .125 | 5 | 40 |
| (B) OUR WORK - OPEN BOTH END TUBES | | | | | |
| 1. Vertical | frontalin | .16 | .02 | .12 | 6 |
| 2. Horizontal | frontalin | .4 | .125 | .89 | 7.1 |
| 3. Vertical | frontalin | .4 | .125 | 1.3 | 10 |
| (C) METHOD OF THIS INVENTION | | | | | |
| 1. | frontalin | .4 | .125 | 0.0068 | 0.054 |
| 2. | frontalin | .16 | .02 | .0009 | .045 |
| 3. | CCl₄ | .2 | .03 | .018 | .6 |
| 4. | o-dichlorobenzene | .2 | .03 | .002 | .066 |
| 5. | cis-7-dodecenyl acetate | .2 | .03 | .000012 | .0004 |
| 6. | cis-8-dodecenyl acetate | .16 | .02 | .000012 | .0005 |
| 7. | linalool | .2 | .03 | .0003 | .010 |
| 8. | disparlure | .2 | .03 | .00006 | .002 |
| 9. | grandlure | .2 | .03 | .0003 | .010 |

It is seen from I(A) that the dissemination rate for frontalin normalized to the hollow cross-section of the fiber is 40 mg/mm²/hr in the work by Pitman and Vite using glass capillaries 0.4 mm in diameter held vertically. This should be compared with our work using the same chemical in 0.4 mm PET tube open at both ends held vertically [Table I(B)]. The difference between 40 mg/mm²/hr and 10 mg/mm²/hr can be accounted for in that the method of Pitman and Vite involves the use of an olfactometer with a controlled forced velocity of air across the open end of the tube, whereas in our experiment the evaporation was carried out in a laboratory with virtually stagnant air. The evaporation in both cases occurs at the air-liquid interface continously presented at the bottom of the micro-tubes. In our experiment, the same micro-tube held horizontally results in a dissemination rate of 7.1 mg/mm²/hr, somewhat lower than when held vertically. A smaller (0.16mm) capillary when held vertically exhibits the slightly lower rate of 6 mg/mm²/hr, but still quite comparable to that experienced with the larger capillary. The important point to be noted is that all these tests lie in the same order of magnitude of dissemination level, i.e., 10 mg/mm²/hr.

By contrast now with the material in Table I, Parts (A) and (B), there are data presented in Table I(C) on the controlled prolonged rate of dissemination exhibited by the methods of our invention. The first two lines in I(C) present information on the disseminaton of frontalin from two different sizes of micro-tube. It will be seen that these two rates are quite consistent with one another, being 0.054 and 0.045 mg/mm²/hr. These values differ by a factor of 200× from the data in I(B), and by as much as 1,000× from the data in I(A), Lines 3 and 4 of I(C) present evaporation rates for two very common materials, carbon tetrachloride and ortho-dichlorobenzene, one of high and the other of moderate volatility. It is seen that their dissemination rates are in the proportion of 10:1 relative to one another, quite in keeping with their relative vapor pressures at room temperature. However, by contrast with the dissemination of hexane [Line 1 of Table I(A)], with a volatility comparable to carbon tetrachloride, they are in the order of 1,000 to 10,000 times less rapidly evaporated. The remainder of Table I(C) describes dissemination rates for a number of pheromones. Line 5, describing the dissemination of looplure(cis-7-dodecenyl acetate), should be contrasted with the work of Shorey shown on the second line of I(A). Here it will be seen that there is a 10-fold reduction in dissemination rate by our invention. Line 6 data describing cis-8-dodecenyl acetate is quite consistent with the dissemination data for the cis-7 isomer. The data of lines 7, 8, and 9 are further confirmation of the capabilities of our invention.

Table II provides the chemical descriptions and insect targets for several of the selected pheromones for which data is presented in Table I.

TABLE II
CORRELATION OF COMMON NAME, CHEMICAL NAME, AND TARGET INSECT OF EVAPORANT FROM COMPARATIVE RATES TABLE (i.e., TABLE I)

| Common Name (Evaporant) | Chemical Name | Target Insect |
|---|---|---|
| Carbon tetrachloride | Tetrachloromethane | — |
| o-dichlorobenzene | 1,2-dichlorobenzene | — |
| Disparlure | Cis-7,8-epoxy-2-methyl octadecane | Gypsy Moth |
| Cis-8-dodecenyl acetate | Cis-8-dodecenyl acetate | Oriental Fruit Moth |
| Frontalin | 1,5-dimethyl-6,8-dioxabicyclo-(3.2.1) octane | Pine Bark Beetle |
| Grandlure Compounds I-IV: | | Boll Weevil |
| Compound I: | Cis-2-isopropenyl-1-methyl-cyclobutaneethanol | |
| Compound II | Cis-3,3-dimethyl-$\Delta^{1,\beta}$-cyclohexaneethanol | |
| Compound III | Cis-3,3-dimethyl-$\Delta^{1,\alpha}$-cyclohexaneethanol | |
| Compound IV | Trans-3,3-dimethyl-$\Delta^{1,\alpha}$-cyclohexaneethanol | |
| Hexane | Hexane | — |
| Linalool | 3,7-dimethyl-1,6 octadien-3-ol | — |

TABLE II-continued
CORRELATION OF COMMON NAME, CHEMICAL NAME, AND TARGET INSECT OF EVAPORANT FROM COMPARATIVE RATES TABLE (i.e., TABLE I)

| Common Name (Evaporant) | Chemical Name | Target Insect |
| --- | --- | --- |
| Looplure | Cis-7-dodecenyl acetate | Cabbage Looper |

The invention accordingly comprises the elements and combinations of elements, features of construction, and arangements of parts which will be exemplified in the structures hereinafter described, and the scope of the application of which will be indicated in the appended claim.

In the accompanying drawings, in which several of the various possible embodiments of the invention are illustrated:

FIG. 1 is an elevation in section, showing a representative filamentary tube of this invention filled with a vaporizing material.

FIG. 2 illustrates a group or stack of the FIG. 1 filled tubes mounted on a base in upright position.

FIG. 3a illustrates a method of assembling a continuous parallel array of filled hollow fibers on an adhesive backing tape, with periodic melt-sealed zones occluding the tubes, and FIG. 3b illustrates how a single dispenser can be cut from such a tape.

FIG. 4b illustrates a single hollow fiber filled with evaporant, open at one end and self-sealed shut at the other by melt bonding; FIG. 4a illustrates the same configuration of hollow fiber where the fiber has not been severed through the heat-sealed region but consists of two microconduits each with one open end and one closed end.

FIG. 5 is a graph illustrating the release rate of carbon tetrachloride using this invention, being Example 3 of Table I(C) given previously.

FIG. 6 is a graph illustrating the release rate of o-dichlorobenzene using this invention, being Example 4 of Table I(C) given previously.

Throughout the drawings, similar reference characters indicate corresponding parts. Dimensions of certain of the parts as shown in the drawings may have been modified and/or exaggerated for the purpose of clarity of illustration and understanding of the invention.

Figure 7:
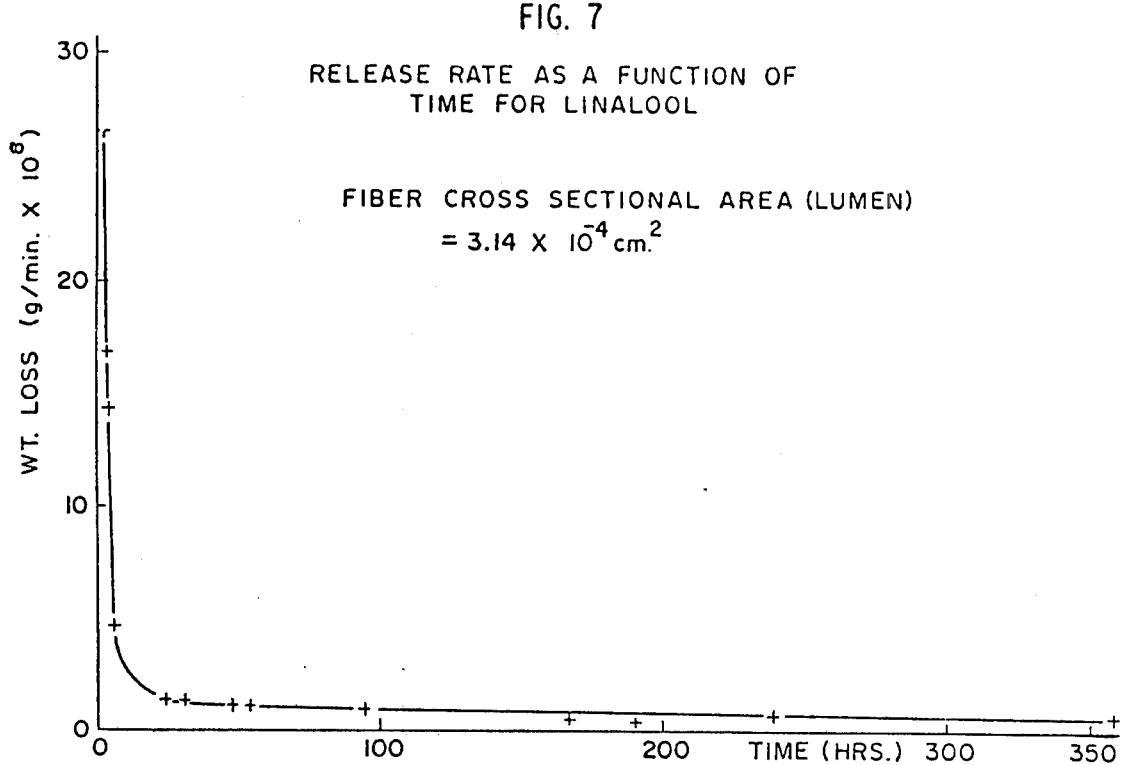
FIG. 7 is a graph illustrating the release rate of linalool using this invention, being Example 7 of Table I(C) given previously.
Figure 9:
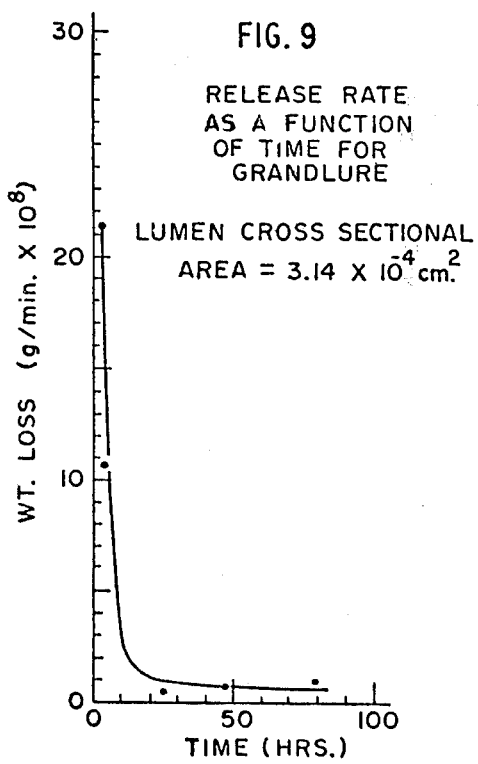
FIG. 9 is a graph illustrating the curve of release rate for grandlure, using this invention, being Example 9 of Table I(C) given previously.
Figure 8:
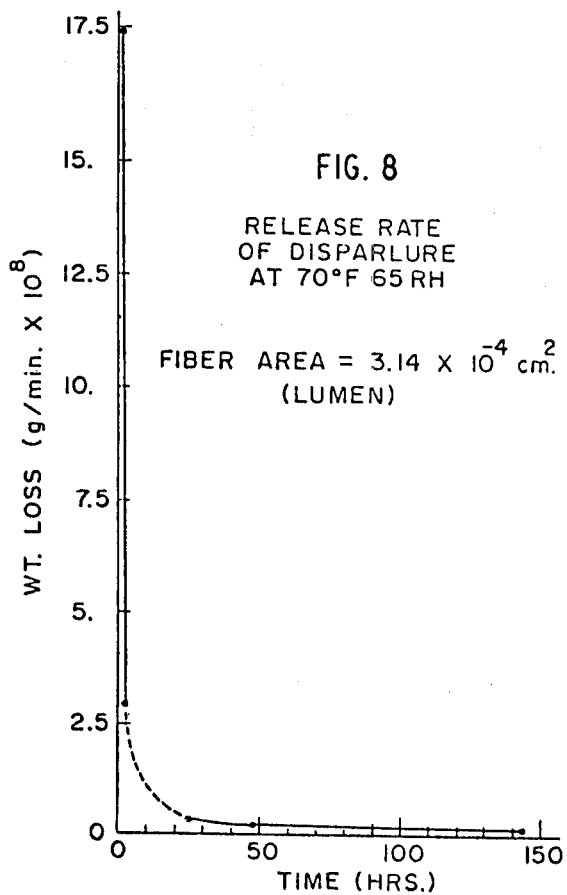
FIG. 8 is a graph illustrating the curve of release rate for disparlure, using this invention, being Example 8 of Table I(C) given previously.

This invention contemplates as a preferred embodiment the use of hollow fibers as reservoirs and dispensers for the vapors to be disseminated for several purposes (such as fragrances for artificial flowers), but particularly for insect sex pheromones where pheromones are employed as trap baits or as a means of interrrupting natural insect mating processes by the so-called disruption technique. Pheromone deposited in the core of hollow filaments of appropriate lengths and internal diameter is released by evaporation from one end of a small tube, the other end being sealed.

The hollow filaments of the invention may be made from any one of a number of natural or synthetic polymeric materials by any of the processes commonly employed in producing man-made fibers. Useful materials include polyesters, polyolefins, acrylics, modacrylics, polyamides, and so on. the selection of an appropriate material will be governed by considerations of chemical compatibility or inertness of the fiber material with the chemical agent or formulation to be incorporated in and released from the hollow filament. Where broadcast distribution of the pheromone hollow filaments is contemplated, such as when employing the disruption technique, environmental considerations might dictate the use of a biodegradable fiber material. Regenerated protein or cellulosic fiber materials would satisfy such a requirement.

Referring now to the drawings, as illustrated in FIG. 1, a capillary tubular filament 2 of this invention, which has a bore or lumen 4, is closed at one end by means such as heat-sealing or a plug 6 such as epoxy cement or other suitable material, and is loaded with the insect attractant 8. The attractant 8 has preferably a wetting type meniscus 10 at its open or upper end in respect to the tube material. If such a meniscus is not obtained as between the vaporizable material and tube, then for a given vaporizable material the proper tube material is selected.

Referring to FIG. 2, a group 12 of tubes 2 is shown, these tubes being held together by conventional means (not shown), such as an exterior wrapping or by being cemented together or by being placed in a suitable outer container. The open ends of the tubes are at the top and the bases of the tubes are mounted by conventional means on a support or base 14. The total amount of insect attractant, or flower fragrance, where the invention is used to provide a fragrance for artificial flowers, that will be released, will depend, as set forth above and below, on the size of the tubes, the particular material used, and the number of tubes which make up the group 12. Since there is an extremely large number of possible variations of these factors, it is impossible to list all of the combinations nor is it necessary to understand and apply this invention. Persons skilled in the art can readily bundle the required number of tubes once the release rate of a given tube containing a given material is known. As was illustrated in Table I(C), for exemplary insect attractants, the release rate is readily determinable. Therefore, all that is needed to design a disseminator for a given total quantity of material is to take the number of hours of release desired, the weight of the insect attractant needed for that number of hours; the amount of attractant per tube will be known by simple computation and then the number of such tubes which need to be placed together to form a group 12 can be readily computed (i.e., by dividing the attractant amount per tube into the total amount).

Referring to FIG. 3a and FIG. 3b, another embodiment of the invention is shown, where a group of capillary tubes like tubes 2 are adhered to a backing tape, periodically sealed along their length, and rolled up in the form of a dispensing tape as shown at 15. The insect attractant 8 does not escape from the tubes until the tubes are severed at selected spots between seal regions. Further detail on this method is given by FIGS. 14, 15, and 16.

The above two embodiments illustrate two ways of mounting the tubes, and the groupings of the tubes can be large or small, depending upon the particular requirement. In actual use, around a field of plant life which it is desired to protect from insects, a number of the structures of either FIG. 2 or FIG. 3b can be placed, so that regardless of which way the wind blows, insects will be attracted to at least some of the sites. Generally, these embodiments will be used in configuration with insect traps for the monitoring of pest population or their elimination by direct trapping. FIGS. 4a and 4b illustrate another embodiment wherein single filled fibers are sealed and cut to expose one or two closed-end channels. 4b is derived from 4a simply by cutting 4a at the center sealed portion. These single fibers may be dispersed broadcast over crops or fields from suitable ground-based or airborne dispensers and may be used for the disruption method of pheromone application.

Referring to FIG. 5, there is shown a typical release rate curve (plotted in terms of weight loss as the ordinate against time as the abscissa) of carbon tetrachloride which is used as an exemplary material in order to establish a model release rate. It will be observed that at the very start, the weight loss is relatively high, as indicated by that portion of the curve A which falls steeply shortly after the start of the release. The curve then flattens out and becomes almost horizontal as indicated at the portion B. It is this prolonged low level of release that comprises one of the most important virtues of our invention. the exact shape of the curve varies somewhat, depending upon the material used and the size of the tubes, but in general it can be said that the curves of all materials tested fall in a similar class of curves.

Referring to FIGS. 6, 7, 8, and 9, curves are shown for the use of the invention, respectively, for o-dichlorobenzene, linalool, disparlure, and grandlure, respectively. Their compositions or chemical name are as follows:
linalool — terpene alcohol
disparlure — cis-7,8-epoxy-2-methyloctadecane
grandlure — a mixture consisting of:
 a. cis-2-isopropenyl-1-methylcyclobutylethanol
 b. cis-3,3-dimethyl cyclohexylidenethanol
 c. cis-3,3-dimethyl cyclohexylideneacetaldehyde
 d. trans-3,3-dimethyl cyclohexylideneacetaldehyde.

Where controlled release of more than a single substance is desired, it is possible to employ bundles or groups of individual fibers charged with different volatile materials. By appropriate selection of individual fiber diameters or the relative numbers of fibers charged with different materials, vapor mixtures can be disseminated with controlled composition. Examples of this variant are (1) the combined use of attractants and toxicants, (2) attractants which are chemical mixtures or which require a chemical synergist in precise ratios in order to be effective, and (3) fragrances or deodorants requiring a mixture of chemicals for optimum effect.

This variant is particular useful where mixtures of chemicals of substantially different volatilities must be dispensed to give a vapor mixture of rather constant composition. Appropriate selection of fiber lengths, as well as diameter or number, allows one to compensate for different rates of evaporation, thereby delivering a vapor mixture of controlled and constant composition. The variant is also useful when the materials one desires to release simultaneously at a controlled rate are imcompatible with one another (i.e., immiscible or chemically reactive) in the condensed phase.

As indicated above, the purpose of having tubes of different sizes is that the variation in the diameters of the tubes is one of the factors that controls the rate of evaporation or release rate of the attractant. Instead of using tubes of various diameters, an alternative is to use tubes of the same size but use more tubes filled with one material than the number of tubes filled with another material, the ratio of tubes determining the resultant vapor compound ratio. If, for example, in a vapor dispersion of two compounds, it is desired to have three parts of one compound to one part of the other compound as the vapors mix on emerging from the tube ends, then a bundle of tubes of a predetermined like diameter would have three times as many tubes of one compound as there are tubes of the other compound, thus giving the required compound mixture. Of course, in obtaining a vapor which is a mixture, the evaporation rates of the individual vaporizable materials need to be considered as factors, and evaporation rates can be usefully employed together with tube diameters, or ratios of tubes of one material to tubes of other materials, to obtain the desired vapor. The combinations of such variables are almost infinite in number and therefore are not set forth herein. It is possible by this technique and by this invention to produce vapors comprising a plurality of discrete compounds. In actual practice, what the manufacturer of the device could do would be to preload tubes of various materials; and then on a custom order basis, the requisite number of tubes would be bundled in accordance with the customer's desires as to the relative proportions of the emergent vapor. In compounding the tube bundles, of course, the weight loss curves for the several compounds would be taken into consideration.

As an example, if the customer desires an attractant together with an insecticide the vapor of which is the killing factor, the customer would order tubes some of which in the bundle would contain the attractant and the other would contain the insecticide liquid. The vapors mix as they emerge from the tubes to produce a mixture of the desired amount of insecticide and attractant. The attractant would attract the insects to the site where the bundled tubes would be stationed, and upon the insects going to the area of the vapors, the insecticide would kill them.

Figure 10:
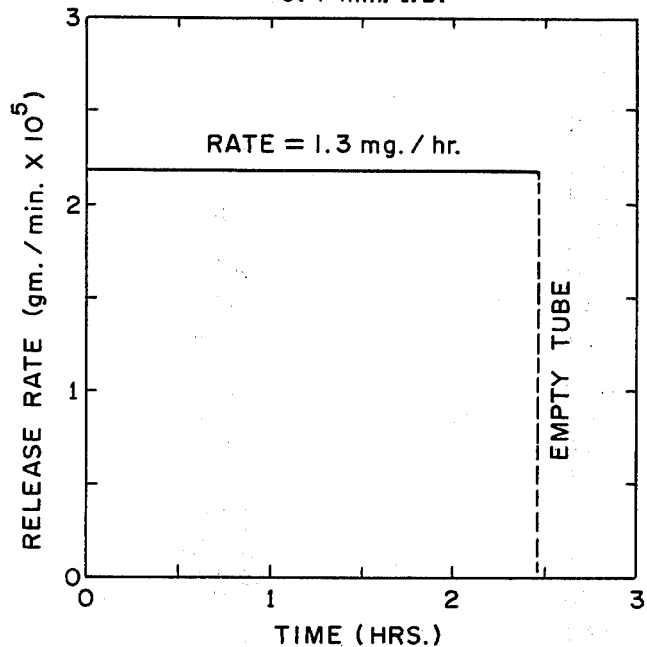
FIG. 10 is a plot of release vs. time for frontalin disseminated from a double-open end tube, being Example 3 in Table I(B) presented previously.

FIG. 10 is a plot of release rate vs. time for frontalin dissemination according to prior art methods from a 0.4 mm PET micro-tube, being the data of Line 3 of Table I(B). It illustrates the high constant rate characterizing this method.

Figure 11:
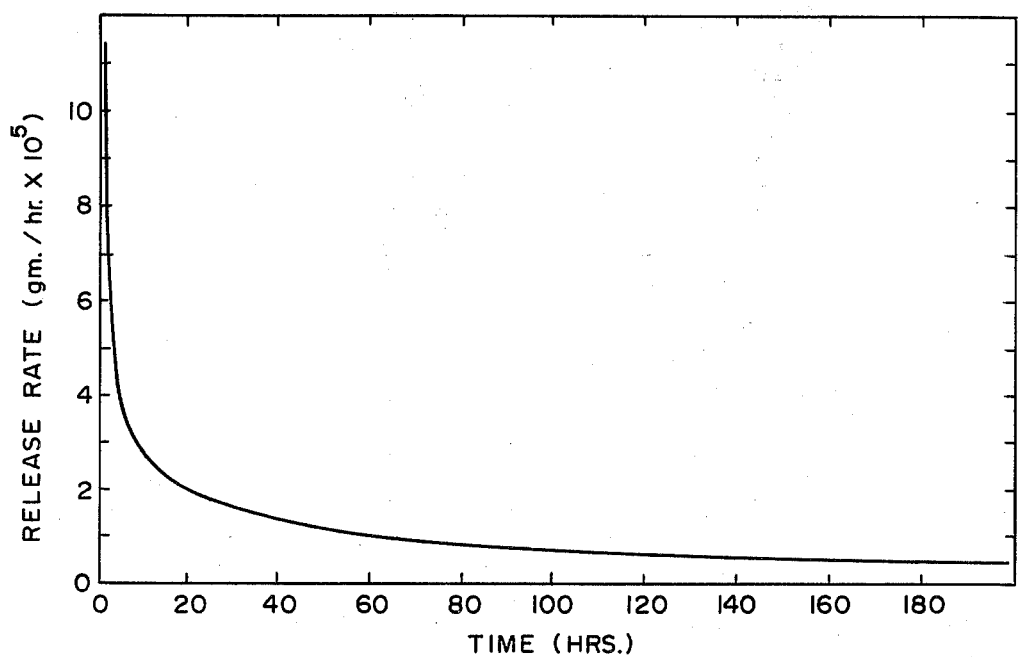
FIG. 11 is a plot of release vs. time for frontalin disseminated according to this invention, being Example 1 of Table I(C) presented previously.

FIG. 11 illustrates dissemination of the same pheromone from the same tube as used in FIG. 10, except as defined by the present invention. It clearly shows the significantly lower controlled rate achieved after the initial rapid fall in rate as described for the previous examples of this invention. (Note that the abscissa in FIG. 11 is in gms/hr × $10^5$ while that in FIG. 10 is in gms/minute × $10^5$.)

Figure 12:
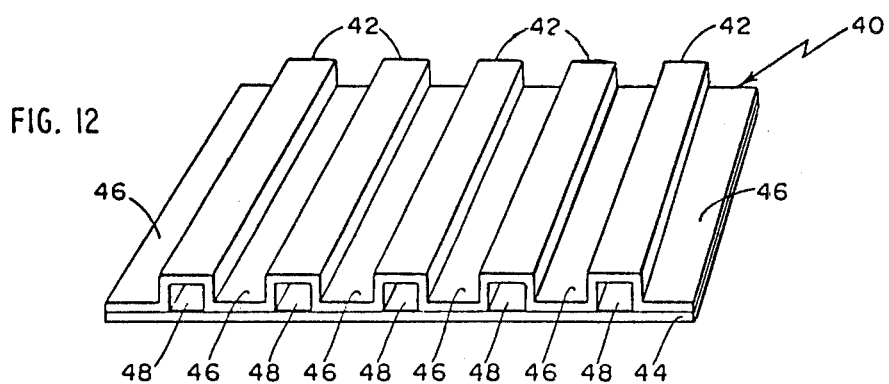
FIG. 12 is another embodiment of the invention in which, instead of using separate tubes, flat sheets are embossed to form channels (rectangular channels being shown, although they could be other shapes, such as semi-circular) and this sheet is adhered to a base sheet in order to provide a plurality of parallel capillary tubes. The channels in this illustration are unfilled and unsealed.

Referring now to FIG. 12, an embodiment is shown in which the capillary tubing is provided by first forming a sheet indicated generally by numeral 40 in such a manner that it has the channels 42 therein. These channels are shown as five in number, but any number desired could be utilized. Also, channels 42 are shown as being rectangular in cross-sectional configuration, but semicircular, oval, or other polygonal channels could also be used. It will be noted that the bottoms of the channels are open, and the sheet 40 is then adhered to a base sheet 41 by attaching the webs 46 securely to the base sheet 44 using conventional adhesives. As a result, between the base sheet 44 and the channel members 42 are provided the capillary tubings 48 as shown, of predetermined cross-sectional shape and size.

Figure 13:
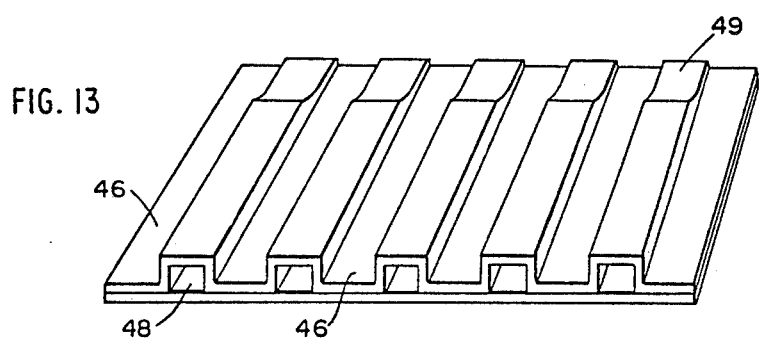
FIG. 13 illustrates transverse sealing zones imposed on the parallel array of channels in FIG. 12, after filling same with latent evaporant.

FIG. 13 illustrates the composite sheet channel system of FIG. 12 filled and sealed across the conduits, as at 49.

Figure 14:
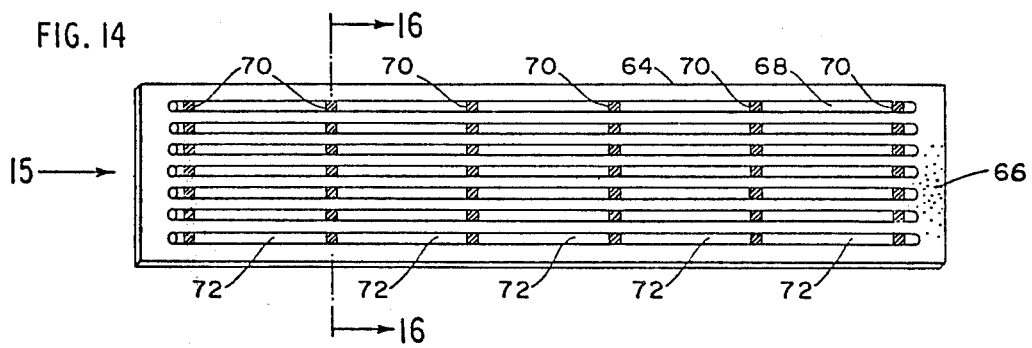
FIG. 14 is another view of the device of FIG. 3a in which a structure is shown having the tubes fastened to a material such as an adhesive coated backing tape, and with the tubes heat sealed to close them at regular intervals along the length of the structure.
Figure 15:
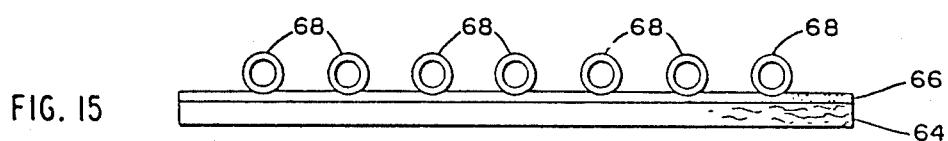
FIG. 15 is an end view, enlarged, of the FIG. 14 structure.
Figure 16:
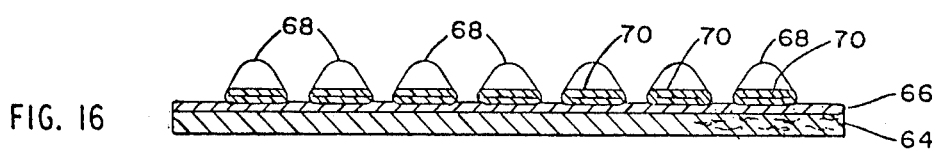
FIG. 16 is a view taken of the FIG. 14 structure, in the direction of sight lines 16—16, the view being in section.

Referring now to FIGS. 14, 15, and 16, more detail is shown of the embodiment of the invention illustrated by FIGS. 3a and 3b. An elongated strip 64 of suitable material having an adhesive coating 66 theron is utilized. Such a material can be conventional masking or wrapping tape which is coated with a pressure-sensitive adhesive. A plurality of filamentary tubes 68 is stretched lengthwise along the combined tape 64, 66, these filamentary tubings being held to the tape by means of the adhesive 66. If it is desired, the adhesive 66 can be of the kind which prior to use is coated with a protective pull-off cover, but in use when the cover is removed and the tubes 68 are adhered thereto, the adhesive then sets in air in order to form a strong fastening of the tubes 68 to the strip 64.

The tubes 68 may be placed upon the strip 64 before or after being filled. After they have been filled and are mounted upon the strip, they are heat sealed along the junction lines 70, the tubing material being of a kind which can be heat sealed by the application of a heated sealing member. By so heat sealing, the tubing wall is collapsed at the points 70 thus providing for each elongated tubing a plurality of sections 72, each section 72 being but a portion of a total length of the individual filaments. In use, the user will cut across the tubings in order to provide short conduit elements of the desired length of tubing, the cutting taking place between the heat sealed portions 70. The length of tubing sections from the closed heat sealed end to the open end, where the cutting takes place, will determine, other parameters being considered in accordance with the teaching of this invention, upon the actual length of the individual section 72. The FIGS. 14–16 embodiment give a convenient way in which to supply to a prospective user either a roll or a flat length of filamentary tubes, already mounted on a base, but in which the tubes are sealed against any loss of material until it is desired to use the tubes. When the user desires to use a certain portion, he will take the material and from an end he will then cut the length of tubing (the cutting taking place across the width of the strip) in order to open the ends of the tubing. The length of the tubing which he determines to cut will depend (other factors can also be considered) on the number of hours he wishes the cut length of tubings to emit their vapors.

In the practice of this invention, the tubular fibers of polymeric material fabricated to convenient dimensions are loaded with an insect attractant by one of the methods described below. The hollow fiber dimensions for practical consideration are generaly in the range of approximately 0.025 to 1.0 millimeters in external diameter, and 0.01 to 0.8 millimeters in internal diameter, although it will be obvious to one familiar with the art of fiber extrusion that micro-tubes both larger and smaller than these limits are attainable and may be considered variants of this invention. (In the ensuing description, the conventional abbreviations of the metric system will be used, for example, mm for millimeters, cm for centimeters, and g for grams.) The illustratred dimensions represent, therefore, a preferred rather than a limiting range. Hollow fiber length will be governed by the length of time desired for release of the attracting agent. Thus, for a given attractant material, the invention allows control over release rate through the number and lumen diameter of fibers employed and control over the period of activity through selection of appropriate fiber length. Release rate curves describing the character of release behavior for this invention typically show a brief period of high release rate followed by a long period of somewhat asymptotic behavior, where the release rate decline, as reflected in the slope of the "asymptotic" portion of the curve, is so small as to approximate a linear release rate. Such release rate curves are given below in respect to several of the examples of the invention that have been made and tested successfully.

The following examples will serve to illustrate the practice and utility of this invention.

EXAMPLES

EXAMPLE I.

This example was given as Line 3, Table I(C) and describes the release or evaporation behavior of carbon tetrachloride (a model compound for relatively volatile attractants or insecticides), from undrawn hollow fibers of polyethylene terephthalate. Fiber dimensions were 0.254 mm external diameter and 0.203 mm internal diameter. Hollow fiber lengths of 127.0 mm to 203.2 mm were loaded with carbon tetrachloride, sealed at one end with an epoxy potting compound, and mounted in a vertical position, open end up, on a flat surface. The lumen cross-sectional area was approximately $3.245 \times 10^{-4}$ cm². Loss of carbon tetrachloride from the fiber core by evaporation and diffusion out of the open end of the fiber was measured by following the liquid meniscus recession into the fiber interior by means of a cathetometer. Incremental volume losses converted to weight losses and plotted as a function of time are displayed in FIG. 5. In this case, a quasilinear release rate is observed after 30 hours.

The releast was measured at quasi-steady rate of weight loss, and the figure given is the average of five samples each.

EXAMPLE II

O-dichlorobenzene, serving as a model for insect attractants or insecticides of intermediate volatility, was loaded by a capillary filling technique into an undrawn polyethylene terephthalate hollow fiber with lumen cross-sectional areas of $3.09 \times 10^{-4}$ cm². Filled hollow fibers 127 mm in length were sealed at one end with an epoxy potting compound, and mounted in a vertical position, open end up, on a flat surface. Release of the o-dichlorobenzene from the hollow fibers was observed and measured by following meniscus recession into the fiber interior. FIG. 6 displays the release curve for this experiment, the data having previously been given as Line 4 of Table I(C). The quasilinear release rate was reached at about 90 hours.

EXAMPLE III

The data for this Example was Line 7 of Table I(C). The terpene alcohol, linalool, chosen as a model for grandlure, the aggregating pheromone of the cotton boll weevil, was loaded into undrawn polyethylene terephthalate hollow fibers with a lumen cross-sectional area of $3.14 \times 10^{-4}$ cm². 102 mm to 127 mm lengths of loaded fiber, sealed at one end with a potting compound, were mounted in a vertical position, open end up, on a flat surface. Release of the linalool from the hollow fibers was monitored by following meniscus recession into the fiber with a cathetometer. FIG. 7 is the release curve for linalool. After about 40 hours, the release rate becomes steady at $5 \times 10^{-9}$ g/min. Assuming a desired release rate for a boll weevil bait of $3 \times 10^{-4}$ g/day, and a required attraction period of 168 days, a bait configuration is calculated to require 42 fiber open ends with individual fiber lengths of 3.8 cm.

EXAMPLE IV

This data was given on Line 8 of Table I(C). Disparlure, the sex attractant for male gypsy moths, was loaded into undrawn polyethylene terephthalate hollow fiber with a lumen cross-sectional area of $3.4 \times 10^{-4}$ cm². The disparlure release curve was obtained as described in Example I. The release rate became steady at $1.44 \times 10^{-6}$ g/day/fiber end as seen from the release curve displayed in FIG. 8. The desired release rate for a gypsy moth sex pheromone trap bait is $2.16 \times 10^{-4}$ g/day and the desired period of activity is 90 day. Thus, a hollow fiber trap bait would required three fiber open ends and an individual fiber length of 0.46 cm per open end.

A commercial insect trap lined with a sticky substance to hold attracted moths in the trap was baited with disparlure loaded hollow fibers and placed in a wooded area of Norfolk County, Mass., during the month of August, 1974. The pheromone baited trap captured male gypsy moths at a ratio of 3:1 over an unbaited trap.

EXAMPLE V

This data was given as Line 9 of Table I(C). Grandlure, the aggregating pheromone attractant of the cotton boll weevil, was loaded into undrawn polyethylene terephthalate hollow fiber with a lumen cross-sectional area of $3.14 \times 10^{-4}$ cm². The grandlure release curve was obtained as described in Exaple II. Release rate became steady at $5 \times 10^{-9}$ g/min/fiber end, as shown in the release curve displayed in FIG. 9. The desired release rate for a cotton boll weevil pheromone bait is $3 \times 10^{-4}$ g/day and the desired period of activity is 168 days. Thus, a hollow fiber trap bait would require 40 fiber open ends with individual fiber lengths of ~4 cm per open end.

The manner in which attractant materials are charged into the hollow filaments of this invention may be one of several. The liquid attractant formulation will fill the hollow filament by capillary action or by gravity feed using the filament as a siphon. (In the siphon method, one end of a tube or tubes is inserted in the desired liquid. The other ends of the tubes are below the liquid surface. A slight suction is applied to the lower ends. Once the liquid flow has started, then the siphon action continues and the tubes fill.) Another filling method involves simply sucking liquid into the fiber core by placing fiber ends beneath the liquid surface and evacuating the fibers from the other end by means of a suction bulb or aspirator device. Yet another involves placing fiber segments beneath the liquid surface and compressing them to force out air, after which they contract and draw the fluid. It is also possible to fill the fiber at the time of spinning by injecting the liquid attractant formulation as a core fluid during the spinning operation. Other methods of filling the filament capillary may come to mind, but it should be noted that the particular method of filling is not a part of this invention.

In view of the above it will be seen that the several objects of the invention are achieved and other advantageous results attained.

It is understood that the inventon is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. A device for dissemination of a vaporizable material at a predetermined rate by vapor diffusion through a stagnant gas layer comprising a elongated capillary conduit of predetermined cross-sectional area and length having one closed end, and a vaporizable substance contained in said conduit, said stangnant gas layer overlaying the vaporizable substance in the conduit.

2. The device of claim 1, in which said vaporizable substance is an insect attractant.

3. The device of claim 1, in which said vaporizable substace has a flower-like odor.

4. The device of claim 1, in which said vaporizable substance is an insecticide.

5. The device of claim 1, in which the material of the capillary conduit is selected from the group of materials comprising the polyesters, polyolefins, acrylics, modacrylics, and polyamides.

6. The device of claim 1, in which said vaporizable substance is a pheromone.

7. The device of claim 1, in which said vaporizable substance is a mixture of an insect attractant and an insecticide.

8. A device for dissemination of a vaporizable material at a predetermined rate by vapor diffusion through two stagnant gas layers comprising an elongated capillary conduit of predetermined cross-sectional area and length having one common sealed region between two open ends and a vaporizable substance contained in the portions of said conduit, said stagnant gas layer overlying said vaporizable substance in said conduit.

9. The device of claim 8, in which said vaporizable substance is an insect attractant.

10. The device of claim 8, in which said vaporizable substance has a flower-like odor.

11. The device of claim 8, in which said vaporizable substance is an insecticide.

12. The device of claim 8, in which the material of the capillary tube is selected from the group of materials comprising the polyesters, polyolefins, acrylics, modacrylics, and polyamides.

13. The device of claim 8, in which said vaporizable substance is a pheromone.

14. The device of claim 8, in which said vaporizable substance is a mixture of insect attractant and an insecticide.

15. A device for dissemination of a vaporizable material at a predetermined rate by vapor diffusion through stagnant gas layers comprising a plurality of elongated capillary conduits of predetermined cross-sectional area and length each having one closed end and a vaporizable substance contained in said conduits, said stagnant gas layer overlying said vaproizable substance in said conduit.

16. The device of claim 15, in which said vaporizable substance is an insect attractant.

17. The device of claim 15, in which said vaporizable substance has a flower-like odor.

18. The device of claim 15, in which said vaporizable substance is an insecticide.

19. The device of claim 15, in which the material of the capillary tubes is selected from the group of materials comprising the polyesters, polyolefins, acrylics, modacrylics, and polyamides.

20. The device of claim 15, in which said vaporizable substance is a pheromone.

21. The device of claim 15, in which said vaporizable substance is a mixture of insect attractant and an insecticide.

22. The device of claim 15, in which the conduits are of at least two different predetermined cross-sectional areas.

23. The device of claim 15, in which some of the conduits contain one vaporizable material and others of the conduits contain at least one other vaporizable material.

24. The device of claim 15, in which some of the conduits contain a vaporizable insect attractant and others of the conduits contain a vaporizable insecticide.

25. The device of claim 15, in which said conduits are formed by occluded corrugations in a sheet material.

26. The device of claim 15, in which said conduits are attached to a common backing strip.

27. A device for the dissemination of a vaporizable material at a predetermined rate by vapor diffusion through stagnant gas layers comprising a plurality of elongated capillary conduits of predetermined cross-sectional area and length each conduit having two open ends with a common sealed region therebetween and a vaporizable substance contained in each conduit, said stagnant gas layers overlying said vaporizable substance contained in each conduit.

28. The device of claim 27, in which said vaporizable substance is an insect attractant.

29. The device of claim 27, in which said vaporizable substance has a flower-like odor.

30. The device of claim 27, in which said vaporizable substance is an insecticide.

31. The device of claim 27, in which the material of the capillary tubes is selected from the group of materials comprising the polyesters, polyolefins, acrylics, modacrylics, and polyamides.

32. The device of claim 27, in which said vaporizable substance is a pheromone.

33. The device of claim 27, in which said vaporizable substance is a mixture of an insect attractant and an insecticide.

34. The device of claim 27, in which the conduits are of at least two different predetermined cross-sectional areas.

35. The device of claim 27, in which some of the conduits contain one vaporizable material and others of the conduits contain at least one other vaporizable material.

36. The device of claim 27, in which some of the conduits contain a vaporizable insect attractant and others of the conduits contain a vaporizable insecticide.

37. the device of claim 27, in which said conduits are formed by occluded corrugations in a sheet material.

38. The device of claim 27, in which said conduits are attached to a common backing strip.

39. A device comprising a plurality of capillary conduits of predetermined cross-sectional area attached to a common backing strip each conduit being closed at predetermined intervals along its length and having a vaporizable material contained therein.

40. The device of claim 39 wherein the composite of conduits and backing strip are wound in a helical coil.

* * * * *